(12) United States Patent
Williams

(10) Patent No.: US 7,654,355 B1
(45) Date of Patent: Feb. 2, 2010

(54) FLYWHEEL SYSTEM FOR USE WITH ELECTRIC WHEELS IN A HYBRID VEHICLE

(76) Inventor: Kevin R. Williams, P.O. Box 1359, Cypress, TX (US) 77421

( * ) Notice: Subject to any disclaimer, the term of this patent is extended or adjusted under 35 U.S.C. 154(b) by 489 days.

(21) Appl. No.: 11/611,015

(22) Filed: Dec. 14, 2006

Related U.S. Application Data

(60) Provisional application No. 60/759,291, filed on Jan. 17, 2006.

(51) Int. Cl.
*B60K 8/00* (2006.01)
*B60K 25/10* (2006.01)
*B60L 11/16* (2006.01)

(52) U.S. Cl. .................... 180/165; 180/65.21

(58) Field of Classification Search ............... 180/165, 180/65.1, 65.21, 65.22, 65.265, 65.31, 65.51; 303/152
See application file for complete search history.

(56) References Cited

U.S. PATENT DOCUMENTS

| | | | | |
|---|---|---|---|---|
| 468,526 A * | 2/1892 | Phillips ...................... 105/52 |
| 1,669,951 A * | 5/1928 | Stitt ........................... 416/60 |
| 3,799,284 A * | 3/1974 | Hender .................... 180/65.25 |
| 3,923,115 A * | 12/1975 | Helling ................... 180/65.25 |
| 3,983,738 A * | 10/1976 | Vlasov et al. ................. 72/429 |
| 4,233,858 A * | 11/1980 | Rowlett ........................ 475/5 |
| 4,272,094 A * | 6/1981 | Patrin ......................... 280/217 |
| 4,392,393 A * | 7/1983 | Montgomery ................. 74/661 |
| 4,393,964 A * | 7/1983 | Kemper ......................... 477/6 |
| 4,423,794 A * | 1/1984 | Beck ........................... 180/165 |
| 4,533,011 A * | 8/1985 | Heidemeyer et al. ..... 180/65.25 |
| 4,591,016 A * | 5/1986 | Matthews .................... 180/165 |
| 4,626,696 A * | 12/1986 | Maucher et al. ........... 290/38 R |
| 4,629,947 A * | 12/1986 | Hammerslag et al. ....... 318/161 |
| 4,745,995 A * | 5/1988 | Wupper .................... 188/181 A |
| 4,829,850 A * | 5/1989 | Soloy ......................... 74/665 B |
| 5,052,987 A * | 10/1991 | Hagin et al. .................. 475/82 |
| 5,053,632 A * | 10/1991 | Suzuki et al. ................. 290/45 |
| 5,067,932 A * | 11/1991 | Edwards ......................... 475/5 |
| 5,086,865 A | 2/1992 | Tanaka et al. |
| 5,172,006 A * | 12/1992 | Suzuki et al. ................. 290/45 |
| 5,492,189 A * | 2/1996 | Kriegler et al. ........... 180/65.23 |
| 5,495,912 A * | 3/1996 | Gray et al. .................. 180/165 |
| 5,515,937 A * | 5/1996 | Adler et al. ............ 180/65.245 |
| 5,575,730 A * | 11/1996 | Edwards et al. ................. 475/5 |
| 5,767,595 A * | 6/1998 | Rosen .......................... 310/74 |
| 5,839,533 A | 11/1998 | Mikami et al. |
| 5,893,895 A * | 4/1999 | Ibaraki ........................ 701/57 |
| 5,915,801 A | 6/1999 | Taga et al. |
| 6,019,319 A * | 2/2000 | Falbel ......................... 244/165 |
| 6,040,634 A * | 3/2000 | Larguier ....................... 290/45 |
| 6,098,735 A * | 8/2000 | Sadarangani et al. ..... 180/65.24 |
| 6,149,544 A * | 11/2000 | Masberg et al. .............. 477/13 |
| 6,286,635 B1 * | 9/2001 | Tamor ........................ 188/72.3 |

(Continued)

*Primary Examiner*—Lesley Morris
*Assistant Examiner*—Jacob Meyer
(74) *Attorney, Agent, or Firm*—Egbert Law Offices PLLC

(57) ABSTRACT

A hybrid vehicle system having first and second internal combustion engines, first and second flywheels respectively coupled to the first and second internal combustion engines, a plurality of motorized wheels electrically interconnected to first and second flywheels, and a controller connected to the internal combustion engines and to the flywheels and to the plurality of motorized wheels for transferring energy therebetween. Each of the flywheels has permanent magnets affixed to a side of a housing thereof. Each of the flywheels is vacuum sealed within a non-ferrous housing.

16 Claims, 3 Drawing Sheets

U.S. PATENT DOCUMENTS

| | | | |
|---|---|---|---|
| 6,306,056 B1 * | 10/2001 | Moore | 475/5 |
| 6,474,068 B1 * | 11/2002 | Abdel Jalil et al. | 60/716 |
| 6,487,998 B1 * | 12/2002 | Masberg et al. | 123/192.1 |
| 6,573,626 B1 * | 6/2003 | Gosebruch et al. | 310/74 |
| 6,688,412 B2 * | 2/2004 | Kima et al. | 180/65.51 |
| 6,710,579 B2 * | 3/2004 | Ebel et al. | 322/4 |
| 6,722,458 B2 * | 4/2004 | Hofbauer | 180/65.25 |
| 6,819,012 B1 * | 11/2004 | Gabrys | 307/68 |
| 6,830,532 B1 * | 12/2004 | Gebby et al. | 477/3 |
| 6,880,654 B2 * | 4/2005 | Plishner | 180/65.6 |
| 6,897,576 B2 * | 5/2005 | Ishikawa et al. | 290/45 |
| 6,962,223 B2 * | 11/2005 | Berbari | 180/165 |
| 7,108,095 B1 * | 9/2006 | Washington et al. | 180/165 |
| 7,152,705 B2 * | 12/2006 | Alster et al. | 180/65.245 |
| 7,293,621 B2 * | 11/2007 | Long | 180/165 |
| 7,317,259 B2 * | 1/2008 | Yamauchi | 290/40 C |
| 7,325,638 B1 * | 2/2008 | Belloso et al. | 180/69.6 |
| 7,410,021 B1 * | 8/2008 | Belloso | 180/69.6 |
| 7,416,039 B1 * | 8/2008 | Anderson et al. | 180/165 |
| 7,416,510 B2 * | 8/2008 | Gebby | 477/2 |
| 7,478,693 B1 * | 1/2009 | Curtis | 180/165 |
| 7,520,353 B2 * | 4/2009 | Severinsky et al. | 180/65.28 |
| 7,552,787 B1 * | 6/2009 | Williams | 180/65.51 |
| 2002/0125861 A1 * | 9/2002 | Ebel et al. | 322/4 |
| 2004/0231632 A1 * | 11/2004 | Colucci et al. | 123/198 A |
| 2007/0012493 A1 * | 1/2007 | Jones | 180/65.3 |

* cited by examiner

FLYWHEEL SYSTEM FOR USE WITH ELECTRIC WHEELS IN A HYBRID VEHICLE

CROSS-REFERENCE TO RELATED U.S. APPLICATIONS

The present application claims priority of U.S. Provisional Application Ser. No. 60/759,291, filed on Jan. 17, 2006, and entitled "Flywheel System for Use with Electric Wheels in Hybrid Vehicles".

STATEMENT REGARDING FEDERALLY SPONSORED RESEARCH OR DEVELOPMENT

Not applicable.

REFERENCE TO AN APPENDIX SUBMITTED ON COMPACT DISC

Not applicable.

BACKGROUND OF THE INVENTION

1. Field of the Invention

The present invention relates to hybrid vehicles. More particularly, the present invention relates to the use of motorized wheels in association with such hybrid vehicles. Additionally, the present invention relates to use of flywheels for the storage and release of energy and for the transfer of energy from separate internal combustion engines within the hybrid vehicle.

2. Description of Related Art Including Information Disclosed Under 37 CFR 1.97 and 37 CFR 1.98.

The need to reduce fossil fuel consumption and pollutants from automobiles and other vehicles powered by internal combustion engines (ICE's) is well known. Vehicles powered by electric motors have attempted to address these needs. However, electric vehicles have limited range and limited power coupled with the substantial time needed to recharge their batteries. An alternative solution is to combine both an ICE and electric traction motor into one vehicle. Such vehicles are typically called hybrid electric vehicles (HEV's).

The HEV has been described in a variety of configurations. Many HEV patents disclose systems where an operator is required to select between electric and internal combustion operation. In other configurations the electric motor drives one set of wheels and the ICE drives a different set.

Other, more useful, configurations have developed. A series hybrid electric vehicle (SHEV) is a vehicle with an engine (most typically an ICE) which powers a generator. The generator, in turn, provides electricity for a battery and motor coupled to the drive wheels of the vehicle. There is no mechanical connection between the engine and the drive wheels. A parallel hybrid electrical vehicle (PHEV) is a vehicle with an engine (most typically an ICE), a battery, and an electric motor combined to provide torque to power the wheels of the vehicle.

A parallel/series hybrid electric vehicle (PSHEV) has characteristics of both the PHEV and the SHEV. The PSHEV is also known as a torque (or power) splitting powertrain configuration. Here, the torque output of the engine is given in part to the drive wheels and in part to an electrical generator. The generator powers a battery and motor that also provide torque output. In this configuration, torque output can be produced from either source or both, simultaneously. The vehicle braking system can also deliver torque to drive the generator to produce charge to the battery.

The desirability of combining the ICE with an electric motor is clear. The ICE's fuel consumption and pollutants are reduced with no appreciable loss of performance or range of the vehicle. Nevertheless, there remains substantial room for development of ways to optimize the HEV's operational parameters. Two such areas of development are engine start/stop and regenerative braking Engine start/stop strategies turn off the engine during times of low power demand from the driver, thereby reducing fuel usage and emission production directly.

Regenerative braking (regen) captures the kinetic energy of the vehicle as it decelerates. In conventional vehicles, kinetic energy is usually dissipated as heat at the vehicle's brakes or engine during deceleration. Regen converts the captured kinetic energy through a generator into electrical energy in the form of a stored charge in the vehicle's battery. This stored energy is used later to power the electric motor. Consequently, regen also reduces fuel usage and emission production. In certain vehicle configurations, the engine can be disconnected from the rest of the powertrain thereby allowing more of the kinetic energy to be converted into stored electrical energy.

Successful implementation of an efficient regen strategy must consider, among other things, the effects of ICE braking on the vehicle. In conventional vehicles, engine braking is well known and is typically characterized by two types of negative powertrain torques including engine friction and pumping losses. Both types of losses result from the engine being driven by the wheels through the powertrain. Engine friction losses result from the piston rings sliding along the cylinder walls and rotation in the bearings of the engine. Engine pumping refers to the compression of the air in each of the engine's cylinders as the engine moves through its stroke. Engine braking allows the driver to reduce vehicle speed without applying force to the brake pedal.

Regenerative braking (regen) is known for conventional ICE vehicles in the prior art. A primitive regen system is described in U.S. Pat. No. 5,086,865 to Tanaka et al. In this patent, a regen controller decouples the engine from the vehicle's powertrain. Based on vehicle speed and gear selection, an electromagnetic clutch couples the powertrain to a hydraulic pump/motor whereby the vehicle's kinetic energy is transferred to a high pressure oil accumulator. The pressure can be transferred back to the powertrain during, for example, the next acceleration of the vehicle.

Regen in an HEV is also known in the prior art. In U.S. Pat. No. 5,839,533 to Mikami et. al., a rapid response drive source brake controller for engine braking and regen is described. The controller determines the gearshift lever position manually set by the driver (e.g., low gear). The engine's brake force (negative torque) increases as the speed ratio of an automatic transmission increases. The controller can engage both engine braking and regenerative braking if the manually selected braking exceeds the maximum regen force that can be generated by the electric generator.

U.S. Pat. No. 5,915,801, to Taga et al., discloses a regen controller to simulate ICE braking torque. This controller disengages the engine from the powertrain via a disconnect clutch and accumulates braking energy (negative torque) in an on-board accumulator such as a generator and battery. The controller improves the speed and efficiency of the regen by, for example, determining the target braking torque according to the release speed of the accelerator pedal. Thus, when large braking torque is required, the controller makes it possible to produce a large amount of regen without delay even before the brake pedal is depressed. This decreases the need for the driver to operate the manual shift lever to a lower gear or further depress the brake pedal. The controller can additionally use inputs from brake pedal position, vehicle speed, vehicle weight, and gradient information to determine target braking torque. By using the controller during regen, the engine may or may not be connected to the powertrain. If the engine is disconnected during regen, there is no engine friction and pumping. This allows the recapture of even more kinetic energy without exceeding the deceleration limits for the vehicle. Obviously, this is advantageous for an HEV from an energy management perspective.

The tradeoff for disconnecting the engine to capture more regen energy is that, with the engine disconnected, the transition back to an engine driving state becomes significantly more complex. If the engine is left connected during regen and the driver depresses the accelerator pedal, it is a straightforward process to restart the engine, if desired, simply by reinitializing fueling of the engine. Any torque disturbance to the powertrain due to the engine restarting would be small, and not completely unexpected by the driver, given the change in demand. Alternatively, if the engine is disconnected from the powertrain during regen, starting the engine would involve maintaining the vehicle's response to the driver's demand using the motor while simultaneously closing the disconnect clutch and starting the engine.

Torque supply to the powertrain should be transferred from the motor to the engine smoothly in order to avoid any disturbance to the driver. It is therefore necessary to develop a strategy to keep the engine connected to the powertrain during regen if a change in driver demand (from decelerating to accelerating) is anticipated. With two modes of regen possible, it will also be necessary to transition the compression braking torque from the engine to the motor as the engine is disconnected from the powertrain in going from one mode to the other.

It is an object of the present invention to provide a hybrid vehicle system having permanently sealed vacuum chambers for the flywheel storage chamber.

It is another object of the present invention to provide a hybrid vehicle system which magnetically couples the flywheel shaft to a brushless excitation field generator.

It another object of the present invention to provide a hybrid vehicle system that magnetically couples a permanent magnet generator to the flywheel chamber.

It is a further object of the present invention to provide a hybrid vehicle system which utilizes two differently sized engines and flywheel storage devices in order to maximize efficiency.

It is still another object of the present invention to provide a hybrid vehicle system that provides better power-to-weight ratio through the use of high speed, high-efficiency engines.

It is still another object of the present invention to provide a hybrid vehicle system which avoids the use of batteries, ultra-capacitors, or super-capacitors for storage capacity.

It is still another object of the present invention to provide a hybrid vehicle system which minimizes the cost and complexity of manufacturing processes through the use of AC induction motorized wheels.

It is another object of the present invention to provide a hybrid vehicle system that is more efficient than conventional parallel or series hybrid system.

It is still an further object of the present invention to provide a hybrid vehicle system that can utilize various sensed parameters to optimize the performance and efficiency of the operation of the vehicle.

It is a further object of the present invention to provide a hybrid vehicle system in which either or both flywheels can be charged through active electrical power electronic controls.

It is still a further object of the present invention to provide a hybrid vehicle system which avoids the use of CV joints, transmissions, driving axles, mechanical couplings, differentials and batteries for energy storage.

It is also another advantages of the present invention to provide a hybrid vehicle system which provides for 100% regenerative four-wheel braking.

These and other objects and advantage of the present invention will become apparent from a reading of the attached specification.

BRIEF SUMMARY OF THE INVENTION

The present invention is a hybrid vehicle system that provides a low-cost solution for electric wheel topology through the use of a flywheel for energy storage. In particular, a pair of internal combustion engines are provided which are magnetically coupled to individual flywheel systems. The energy output of the flywheel system can then be transferred to a DC bus which can deliver energy to AC induction motorized wheels. The braking energy of such wheels can also be transferred back through the use of permanent magnets to the flywheels. Suitable control mechanisms are independently connected to the separate internal combustion engines and to the other components of the system so as to regulate and control the flow of energy through the system. External sensors can be connected to the control system so as to provide input information for the proper processing of the system of the present invention. It is believed that the efficiency of the hybrid vehicle system of the present invention is better than any existing hybrid technology.

In the present invention, the energy stored is displaced into two separate vacuum-chambered flywheels which are housed in separate material enclosures formed of non-ferrous material. Permanent magnets are embossed into one side of each of the rotating flywheels. The flywheels are magnetically coupled to an AC winding (i.e., a stator) which is mounted stationary to the chassis of the vehicle. The magnetic coupling effect through the non-ferrous material allows for a non-penetrated vacuum chamber that can be permanently sealed for an inexpensive form of flywheel chamber.

The opposite end of the rotating flywheel is also magnetically coupled to the rotating shaft of the separate engines by way of a magnetic field coupling. The rotating flywheel has embedded permanent magnets so as to provide the torque flux and is coupled with electromagnetic coils that are fixed to the shaft of the engine.

The engine shaft has these electrically-operated coils thereon. The coils are energized by the control system by way of computer command. The coils on the engine shaft operate from a low power use so as to be energized with alternating and reversed magnetic fields and to couple with the rotating flywheel permanent magnet fields through the non-ferrous material of the flywheel housing. In order to achieve the electric current (i.e. the excitation current) to the rotating pole pieces, a low power, stationary DC field is applied to the pole pieces and extending around the rotating shaft.

A small multi-phase winding with laminations is affixed to the rotating shaft. The effect of the stationary DC field flux that is imposed onto the rotating multi-phase winding creates an alternating current which is diode-rectified with a rotating bridge rectifier plate. The flywheel assembly is soft-coupled and de-coupled by the controller. The generator end of the flywheel assembly includes a set of permanent magnets that are electro-magnetically coupled through the non-ferrous housing so as to create the necessary magnetic flux which generates the electrical power that is rectified and later inverted for the power to the AC induction motorized wheels.

It is important to note that the sizes of the engines differ from one another. However, the transfer of energy between the systems is controlled for optimum efficiency and performance by way of the controller. Optimization algorithms for energy and power load profiles for typical driving conditions will serve to optimize the energy transfer and engine control by way of the controller. The AC power from each assembly is rectified and passed to DC busses that are tied together by active rectifier front ends. The common DC bus will feed four separate inverters for individual control of each of the four motorized wheels. The wheels are cast aluminum and have outer rims acting as the shorting rings for an "inside out" induction motor.

Once the vehicle is started, the flywheels are pre-charged and are electrically coupled to one another by the controller. One engine can charge both flywheels, one flywheel, or alternate in charging one or both flywheels. All regenerative braking is captured with an active vector control.

The computerized controller makes the decisions as to the choice of which of the engines are running. The electro-magnetic soft coupling is energized only during the charged cycle and charges the flywheel or flywheels only over the most efficient r.p.m. range of the engines. The computerized controller also can utilize GPS for feedback information. Front and rear sensors can be provided for detecting other vehicles so as to provide feedback signals to the computerized controller. The computerized controller can make decisions based on efficiency and rate of change of the energy transfer and the flywheel storage devices. Also, memory learning, such as day-to-day driving, can be utilized so as to maximize the efficiency of the operation of the vehicle.

DETAILED DESCRIPTION OF THE INVENTION

Figure 1:
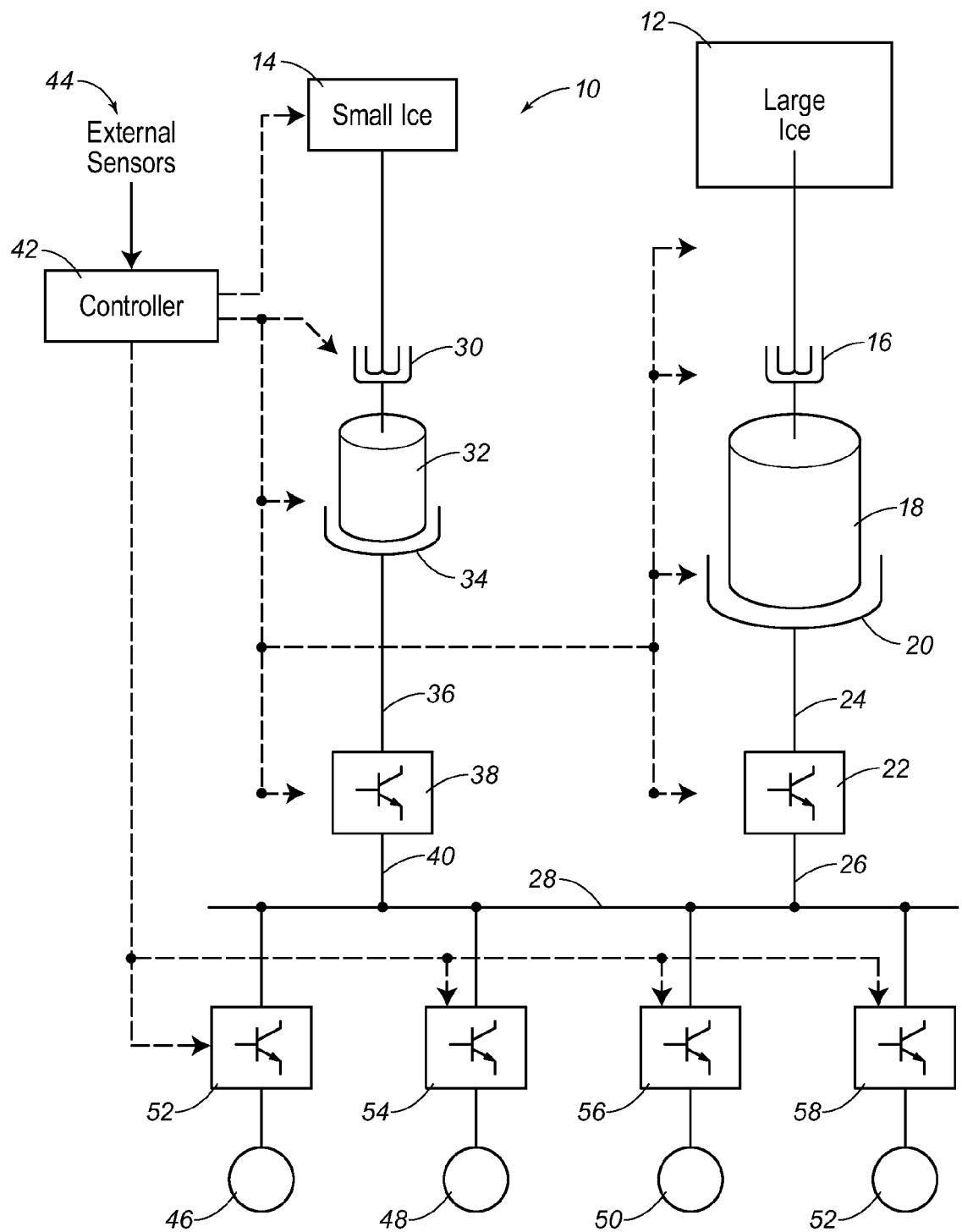
FIG. 1 is a schematic illustration of the topology of the hybrid vehicle system in accordance with preferred embodiment of the present invention.

Referring to FIG. 1, there is shown the topology 10 of the hybrid vehicle system in accordance with the preferred embodiment of the present invention. The topology 10 includes a large internal combustion engine 12 and a smaller internal combustion engine 14. The large internal combustion engine 12 is coupled by an electromagnetic coupling 16 to a flywheel 18. The flywheel 18 has permanent magnets 20 extending therearound. A rectifier 22 is connected by electrical line 24 to the permanent magnets 20 associated with flywheel 18. Rectifier 22 can be AC/DC active and DCAC-TUATOR 300 control. The rectifier 22 is connected by line 26 to a common DC bus 28.

Similarly, the smaller internal combustion engine 14 is coupled by an electro-magnetic coupling 30 to another flywheel 32. Permanent magnets 34 are cooperative with the flywheel 32 so as to transmit a electrical voltage along line 36 to the rectifier 38. The rectifier 38 is also AC/DC active and DCACTUATOR 300 control. Line 40 will connect the rectifier 38 to the common DC bus 28.

The computerized controller 42 is illustrated as interactive with the engines 12 and 14, the electro-magnetic couplings 16 and 30, the flywheels 18 and 32 and the rectifiers 22 and 38. External sensors 44 are connected to the controller 42 so as to provide input information to the controller regarding a wide variety of variables that can affect the driving condition and condition of the hybrid vehicle system.

Wheels 46, 48, 50 and 52 are utilized on the vehicle of the hybrid vehicle system of the present invention. Wheels 46, 48, 50 and 52 are AC induction motorized wheels. A rectifier 52 connects the DC bus 28 to the wheel 46. A rectifier 54 connects the DC bus 28 to the wheel 48. A rectifier 56 connects the DC bus 28 to the wheel 50. A rectifier 58 connects the DC bus 28 to the wheel 52. The computerized controller 42 is cooperative with each of the rectifiers 52, 54, 56 and 58 so as to effectively control the operation of the respective wheels 46, 48, 50 and 52.

The sizes of the engines 12 and 14 and the flywheels 18 and 32 will differ from one another. It is important to note that the transfer of energy between the systems associated with the large internal combustion engine 12 and the smaller internal combustion engine 14 is controlled by the controller 42. Additionally, the power transferred from the systems to the wheels 46, 48, 50 and 52 is controlled by the controller 42 so as to optimize the efficiency and performance of the vehicle. Optimization algorithms for energy and power load profiles for typical driving conditions will serve to optimize the energy transfer and engine control by way of the controller 42. The AC power produced by the permanent magnets 20 and 34 is rectified by the rectifiers 22 and 38. The DC bus 28 is tied together by active rectifier front ends. The power coming from either of these systems is controlled by the controller 42 for optimized performance and efficiency based on driving condition profiles. The common DC bus 28 feeds the four inverters 52, 54, 56 and 58 for individual control of each of the respective wheels 46, 48, 50 and 52.

Figure 2:
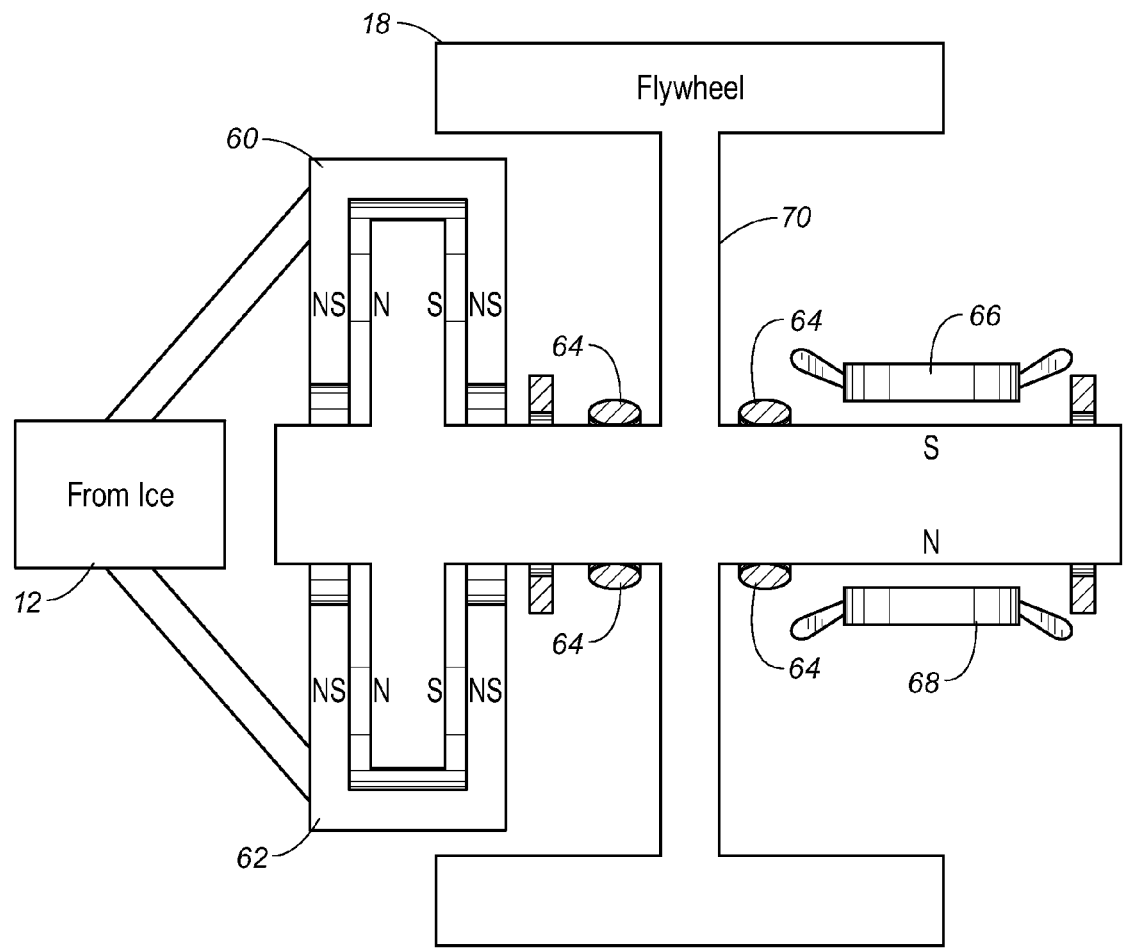
FIG. 2 is a diagrammatic illustration of the interaction of the flywheel system for the production of energy.

FIG. 2 illustrates the flywheel 18 as arranged so as to be cooperative with the large internal combustion engine 12. It can be seen that calipers 60 and 62 extend from the internal combustion engine 12 so as to be cooperative with the flywheel 18. Ferrofluid seals 64 serve to seal the flywheel 18. Stationary windings 66 and 68 are provided on opposite sides of the flywheel 18 and can be suitably mounted to the vehicle. The flywheel 18 is vacuum-chambered and sealed within a non-ferrous housing 70. The calipers 60 and 62 magnetically couple the flywheel 18 to the rotating shaft of the engine 12 by way of a magnetic field coupling. The flywheel has embedded permanent magnets which provide the torque flux and are coupled with the electro-magnetic coils that are fixed onto the shaft of the engine 12. With reference to FIG. 1, the permanent magnets 20 are embossed onto a side of the flywheel 18. This magnetic coupling effect through the non-ferrous material of the housing 70 allows for the use of a non-penetrating vacuum chamber that can be permanently sealed and provides an inexpensive form of flywheel chamber.

Figure 3:
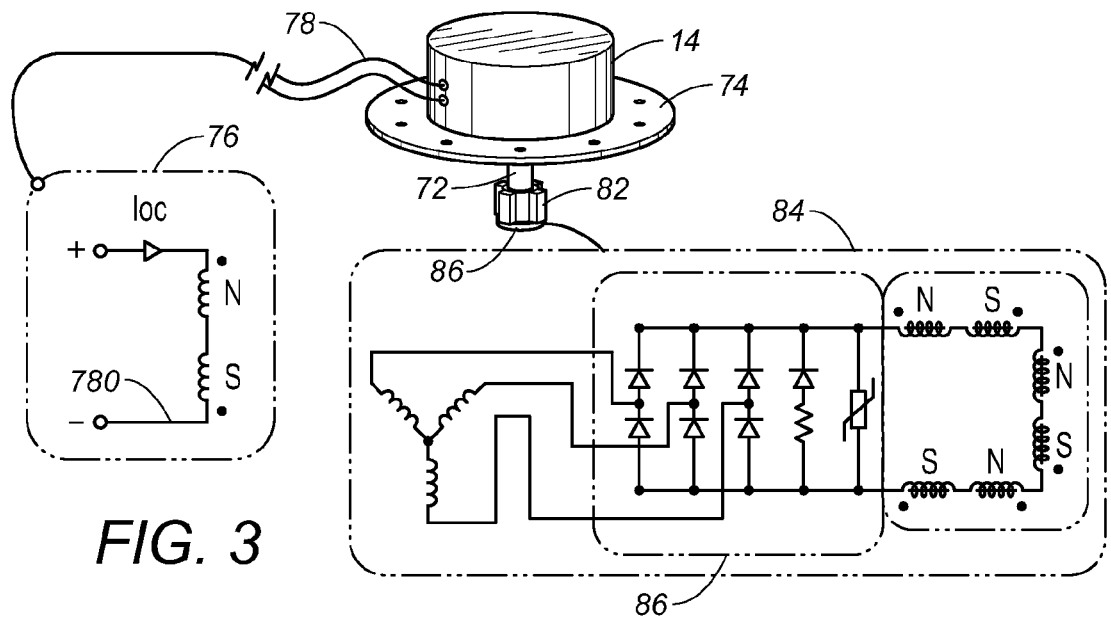
FIG. 3 is a schematic representation of the magnetic coupling of the internal combustion engine with the flywheel.

FIG. 3 illustrates the electronics associated with either of the engines 12 and 14. For the purposes of illustration, engine 14 is particularly illustrated. Each of the engines 12 and 14 are of a vertical design and meet the latest emission standards set by Federal regulatory agencies. They are vertically mounted on independent "soft" mounted engines plates. The shaft 72 of engine 14 protrudes through a mounting plate 74. The independent flywheel assembly chambers are aligned by machined lips (not shown) at the bottom of the mounting plate 74 and are merely bolted into their respective locations so as to become properly aligned. The flywheel will also sit vertically and slide into the internal combustion engine so that the magnetic coupling creates a more balanced effect.

In FIG. 3, it can be seen that a stationary DC excitation field input 76 is connected by lines 78 to the engine 14. This field 76 is made up of a low-power DC coupling current produced by circuit 80. The engine shaft 72 is energized by the controller 42 and works from a lower power set of electrical coils, such as that provided by circuit 80, so as to energize north, south, north, etc. poles which couple to the rotating flywheel permanent magnet fields through the non-ferrous material of the housing 70. In order to achieve the electrical current (i.e. the excitation current) to the rotating pole pieces, the lower power use, stationary DC field is applied to the pole pieces 82. The pole pieces 82 will extend around the rotating shaft 72. A small multi-phase winding with laminations is affixed to the rotating shaft 72. The effects of the stationary DC field flux imposed onto the rotating multi-phase winding 84 creates an alternating current which is diode-rectified with a rotating bridge rectifier plate 86. This DC current is proportional to the amount of excitation on the stationary DC field as controlled by the controller 42. This DC current passes through the rotating north/south pole pieces 82 so as to magnetically couple the flywheel 32 by way of the permanent magnets. The flywheel assembly 32 is now soft-coupled and de-coupled by the controller 42. The generator end of the flywheel assembly 32 is a set of permanent magnets 34 which are electro-magnetically coupled through the non-ferrous housing 70 so as to create the necessary magnetic flux to generate the electrical power that is rectified and later inverted for the power to the wheels 46, 48, 50 and 52, as described hereinabove.

Figure 4:
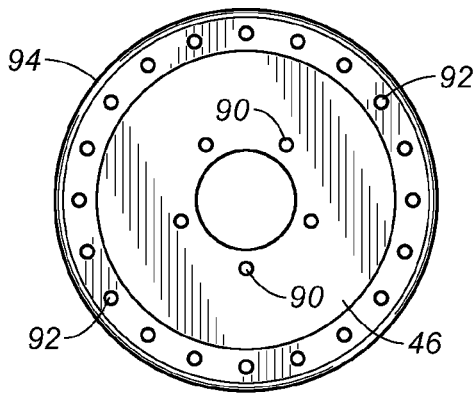
FIG. 4 is a side elevational view of the AC induction wheel as used in the hybrid vehicle system of the present invention.

FIG. 4 is a side view showing the AC induction wheel 46. The wheels 48, 50 and 52 have an identical configuration. The wheel 46 has bolt holes 90 that are similar to those of typical wheel mountings. Holes 92 are provided in spaced relationship around the periphery of the wheel 46. Holes 92 provide a space for the rotor bars to stab into. The wheel 46 is manufactured in a simple and inexpensive manner. The wheel 46 is formed of cast aluminum material. The wheel 46 has an outer rim 94 that acts as the shorting rings for an "inside out" induction motor. The wheel 46 can bolt onto standard hub configurations for typical rotation relative to the standard brake/disc and unsprung mass components. The "stator" is stationary and affixed to the chassis of the vehicle by mounting bolts. The air gap between the rotor and the stator is set upon bolting the wheel 46 to the hub. The present invention can also provide a tapered machined brace that aligns the air gap. The stator is a typical AC vector water-cooled machine, as utilized in other hybrid designs.

Figure 5:
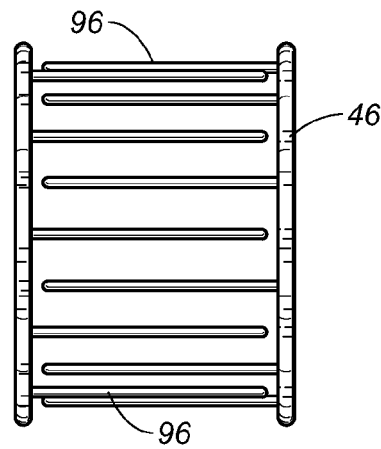
FIG. 5 is a side view of the AC induction wheel of the present invention.

FIG. 5 is a side view of the wheel 46. As can be seen in FIG. 5, bars 96 are arranged so as to "stab" into the holes 92. The rotor bars 96 can be welded, trimmed or ground smooth.

Figure 6:
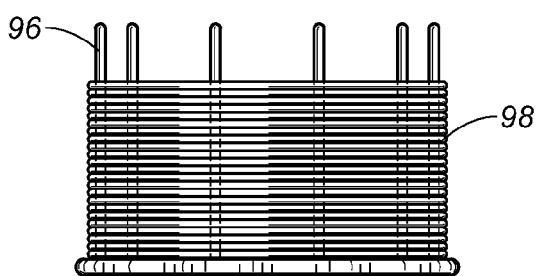
FIG. 6 illustrates the manner in which laminations are applied to the AC induction motor as used on the wheels of the hybrid vehicle system of the present invention.

FIG. 6 shows the laminations 98 that can be placed onto the bars 96 during the assembly of the rotor with the wheel 46. The center ring of the wheel 46 is actually two halves of the rotor bars 96 in which the rotor bars 96 are simply part of the casting on one half of the wheel. Every other bar is from the opposite half and the ends of the bar protrude through the holes 92 into the other half of the wheel 46. In this manner, strength is maintained. The pre-balanced wheel is more symmetric. The cost of this set up and tooling for mass production is the same for both halves of the wheel 46. The laminations 98 are pre-punched and stacked into one half of the wheel 46 in the manner of standard AC inductions. The wheel is symmetrically welded. Similarly, the rotor bars 96 are welded on the protruded side on ends into the rims as shorting rings for standard AC induction rotors.

Once the vehicle of the present invention is started, the flywheels 18 and 32 are pre-charged. Even though these flywheels 18 and 32 are independently driven from their respective engines 12 and 14, they are electrically coupled to one another by controller 42. One of the engines 12 and 14 can charge both flywheels 18 and 32, one flywheel, or alternate in charging one of the flywheels 18 and 32. All regenerative braking is captured with active vector control. The computerized controller 42 makes the decisions as to the choice of which engine 12 or 14 is running. The electro-magnetic soft coupling is energized only during the charge cycle and charges the flywheel(s) only over the most efficient r.p.m. range of the engines 12 and 14. Rear and front sensors, such as sensors 44, can be used for detecting other automobiles or road vehicles so as to provide feedback signals to the controller 42. As an example, when one is using the vehicle of the present invention to drive down a highway, a GPS feedback loop can tell the controller 42 the driving location. A power sensor and a throttle feedback sensor can inform the controller 42 of the power usage and of the driving condition of the operator. The driving condition of the operator can be based upon whether the operator has been driving steady with cruise control or manually operating the vehicle. The operator can make the control decision in which to pre-charge the larger flywheel 18 to between 6000 r.p.m. and 8000 r.p.m. This is the most efficient range for the engine 12. However, the operator can also choose the smaller engine 14 to start and Dec. 12, 2006 stop the charging of the flywheel 18 by way of the electrical coupling from the smaller engine 14 through the active electrical coupling of the flywheels 18 and 32 by means of the DC bus 28 and by their respective inverters.

The active sensor 44 can provide feedback to the controller 42 such that the controller 42 will analyze the data and determine that the vehicle is quickly approaching another vehicle. When the controller 42 anticipates a passing condition through the depressing of the accelerator, the net power will be the action of the passing mode and be performed by utilizing the energy from both flywheels 18 and 32. The controller 42 can then make the decision to start the larger engine 12 in order to recharge the flywheels 18 and 32 quickly. The controller 42 can make this decision based upon the efficiency and rate of change of the energy transfer in the flywheels 18 and 32. Through the GPS feedback, the controller 42 can anticipate the presence of lights, exit ramps, stop lights and intersections. As a result, intelligent decisions can be calculated and anticipated. The controller 42 can thus carry out the most efficient mandates for the operation of the vehicle.

The present invention also facilitates the ability of memory learning, such as from day-to-day driving. Efficiency can be maximized from self-taught knowledge of anticipation of typical routes which are part of the learned memory of the controller 42. Four wheel braking with vector control fully regenerative braking is accomplished in typical stop-and-go city driving. The efficiency of the system of the present invention is maximized in utilizing the smaller engine 14 only. The system of the present invention is very efficient by avoiding the use of CV joints, transmissions, diffentials, drive axle trains, and batteries for energy storage and costly brake losses. The engine/energy storage/power transfer is maximized by utilizing two different sized engines and by electromagnetically coupling the stored energy devices. The engines are run in their "sweet spot". One hundred percent regenerative braking is realized so as to make the system better than series or parallel hybrid systems. The performance/efficiency ratio due to the amount of stored energy and means of transfer utilization of the two systems makes for a high performance and maximum efficiency system.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A hybrid vehicle system comprising:
   a first internal combustion engine;
   a second internal combustion engine;
   a first flywheel coupled to said first internal combustion engine;
   a second flywheel coupled to said second internal combustion engine;
   a plurality of motorized wheels electrically interconnected to said first and second flywheels; and
   a controller means connected to said first and second internal combustion engines and to said first and second flywheels and to said plurality of motorized wheels for transferring energy therebetween, said first internal combustion engine having a shaft extending therefrom, said first flywheel being electromagnetically coupled to said shaft of said first internal combustion engine, said second internal combustion engine having a shaft extending therefrom, said second flywheel being electromagnetically coupled to said shaft of said second internal combustion engine.

2. The system of claim 1, each of the shafts of said first and second internal combustion engines having a coil thereon, said coil being energized with alternating and reversed magnetic fields, said coil being coupled to a permanent magnetic field of the flywheel.

3. The system of claim 2, said coil comprising a multiphase winding affixed to the shaft.

4. The system of claim 1, each of said first and second flywheels being enclosed in a non-ferrous housing.

5. The system of claim 4, said non-ferrous housing having a vacuum therein.

6. The system of claim 1, each of said first and second flywheels having permanent magnets embossed onto a side of the flywheel.

7. The system of claim 1, each of said first and second flywheels being magnetically coupled to a stator mounted stationary relative to the flywheel.

8. The system of claim 1, said first internal combustion engine having a greater power output than said second internal combustion engine.

9. A hybrid vehicle system comprising:
   a first internal combustion engine;
   a second internal combustion engine;
   a first flywheel coupled to said first internal combustion engine;
   a second flywheel coupled to said second internal combustion engine;
   a plurality of motorized wheels electrically interconnected to said first and second flywheels;
   a controller means connected to said first and second internal combustion engines and to said first and second flywheels and to said plurality of motorized wheels for transferring energy therebetween;
   a bus being connected to said first and second flywheels and to said plurality of motorized wheels;
   a rectifying means cooperative with said first and second flywheels for converting an AC output of said first and second flywheels into DC power, said rectifying means connected to said bus; and
   an inverting means interposed between said bus and said plurality of motorized wheels for converting the DC power of said bus into said AC power to said plurality of motorized wheels.

10. The system of claim 9, each of said plurality of motorized wheels being AC induction wheels.

11. A hybrid vehicle system comprising:
    a first internal combustion engine;
    a second internal combustion engine;
    a first flywheel coupled to said first internal combustion engine;
    a second flywheel coupled to said second internal combustion engine;
    a plurality of motorized wheels electrically interconnected to said first and second flywheels;
    a controller means connected to said first and second internal combustion engines and to said first and second flywheels and to said plurality of motorized wheels for transferring energy therebetween;
    a first set of permanent magnets cooperative with said first flywheel; and
    a second set of permanent magnets cooperative with said second flywheel, said first set of said permanent magnets embossed into a housing of said first flywheel, said second set of permanent magnets embossed into a housing of said second flywheel, each of said first and second sets of permanent magnets being electrically cooperative with said plurality of motorized wheels, each of said first and second sets of permanent magnets for transferring energy from said first and second flywheels respectively to said plurality of motorized wheels and for transferring braking energy from said plurality of motorized wheels to said first and second flywheels.

12. The system of claim 11, said controller means for selectively causing a transfer of energy from one of said first and second internal combustion engines to said first and second flywheels and for selectively transferring energy from one of said first and second flywheels to said plurality of motorized wheels.

13. The system of claim 11, further comprising:
    a sensor means cooperative with said controller means for sensing a condition external of the system and for communicating such condition to said controller means.

14. The system of claim 11, further comprising:
    a vehicle having a chassis, said plurality of motorized wheels being supported by said chassis, said chassis having said first and second internal combustion engines supported thereon.

15. The system of claim 11, said controller means for selectively causing a transfer of energy from said first internal combustion engine to said second flywheel, said controller means for selectively causing a transfer of energy from said second internal combustion engine to said first flywheel.

16. The system of claim 11, each of said plurality of motorized wheels being individually controlled by said controller means.

* * * * *